Figure 1:
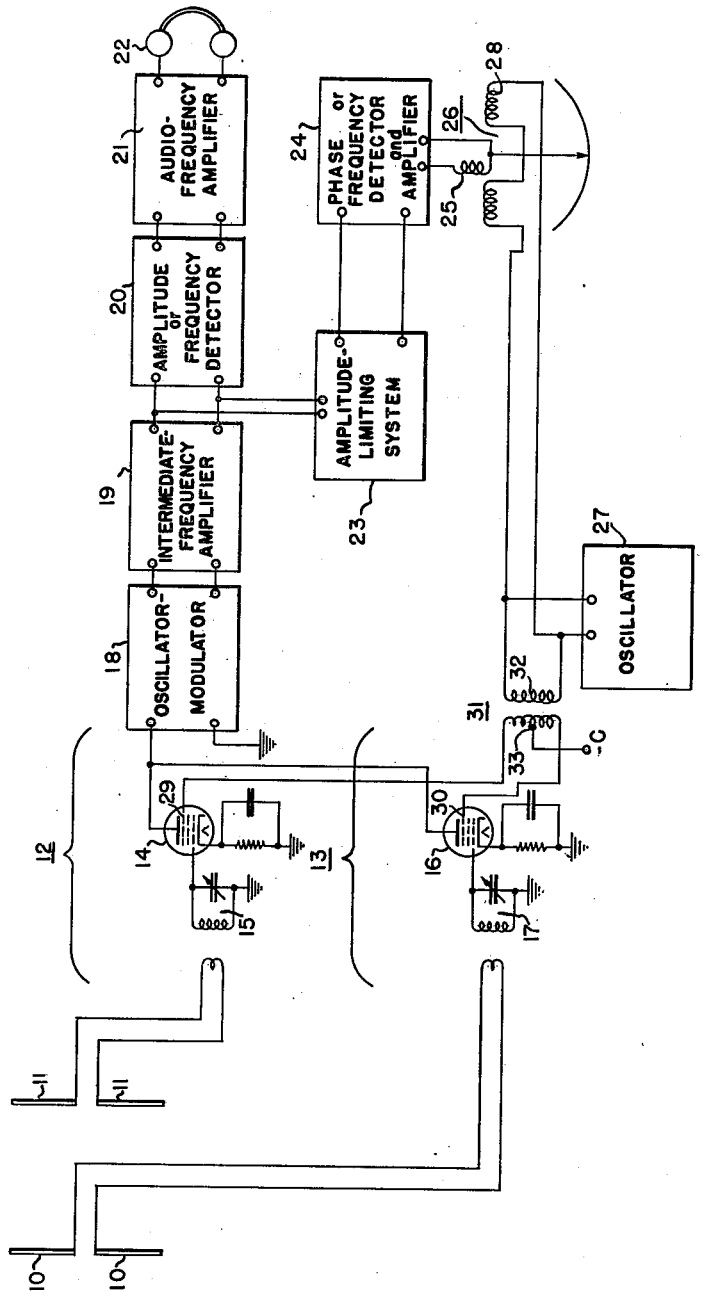

July 9, 1946.   A. V. LOUGHREN   2,403,727
DIRECTION FINDING SYSTEM
Filed Nov. 10, 1941   3 Sheets-Sheet 2

INVENTOR
ARTHUR V. LOUGHREN
BY Harry B. Page
ATTORNEY

July 9, 1946.    A. V. LOUGHREN    2,403,727
DIRECTION FINDING SYSTEM
Filed Nov. 10, 1941    3 Sheets-Sheet 3

INVENTOR
ARTHUR V. LOUGHREN
BY
ATTORNEY

Patented July 9, 1946

2,403,727

UNITED STATES PATENT OFFICE 2,403,727

DIRECTION-FINDING SYSTEM

Arthur V. Loughren, Great Neck, N. Y., assignor, by mesne assignments, to Hazeltine Research, Inc., Chicago, Ill., a corporation of Illinois Application November 10, 1941, Serial No. 418,541

8 Claims. (Cl. 250—11)

The present invention relates to direction-finding systems and particularly to such systems of the type employing a pair of spaced antenna systems by which to receive a carrier wave radiated from a remote point and to utilize the two carrier waves received by the pair of antenna systems to provide an indication of the direction of the source of the carrier wave relative to the orientation of the antenna systems or, conversely, by which two carrier waves may be radiated to a remote point and may be received at the remote point and utilized to provide an indication of the direction of the remote point from the antenna systems.

It is frequently desirable to obtain a directional indication as well as an indication of the sense of direction of a transmitting station from a receiving apparatus. Direction-finding systems are known for this purpose and are useful in determining the position of a transmitting station from two receiving stations or of a receiving station from two transmitting stations, such determination being effected by the method of triangulation.

In one form of direction-finding system of the prior art, the receiving station employs a single antenna system having a sharply-directive characteristic by which an indication of the direction of a transmitting station is determined by so orienting the antenna system that the received carrier wave has minimum intensity. This is the so-called null method of direction determination. Such systems have the disadvantage that the null point, that is, the point providing minimum carrier-wave intensity, cannot be accurately determined for numerous well-known reasons. Systems of this nature have the further disadvantages that the sense of direction of the transmitting station cannot be obtained without the use of an additional antenna system and additional receiving equipment used therewith. There is the further disadvantage that, since the system is operated to provide minimum intensity of the received carrier wave, any modulation components of the received carrier wave cannot ordinarily be satisfactorily reproduced during the time that a bearing is being taken on the transmitting station. This fact prohibits the use of such systems where it is essential that modulation components of the received carrier wave be continuously and satisfactorily reproduced simultaneously with the act of taking a bearing on the transmitting station, as, for example, to insure that two such direction-finding systems take simultaneous bearings on the same transmitting station.

Another form of prior art direction-finding system employs a directional antenna system, as in the arrangement just described, but uses in addition a so-called "sense" antenna system whereby the sense of the direction of the transmitting station may be determined and by which modulation components of the received carrier wave may be continuously reproduced simultaneously with the operation of taking a bearing on the transmitting station. While this prior art arrangement avoids several of the disadvantages and limitations of the prior art system first described, it has the disadvantage that the antenna systems employed are frequently complex and require critical relative proportioning. There is the additional disadvantage that the receiving apparatus used in such systems is relatively complex, and therefore expensive, and generally requires that critical proportioning of circuit constants be established and maintained between the units of the apparatus which are connected to the several antenna systems if satisfactory operation of the direction-finding system is to be secured.

It is an object of the present invention, therefore, to provide a new and improved direction-finding system which avoids one or more of the disadvantages and limitations of prior art systems.

It is a further object of the invention to provide a direction-finding system of the type employing at least one pair of spaced antennas and one possessing a degree of sensitivity and accuracy of a much higher order of magnitude than prior art direction-finding systems of this nature.

It is an additional object of the invention to provide a direction-finding system adapted to receive a modulated carrier wave and one in which a bearing may be taken on the source of the received carrier wave while simultaneously, continuously, and satisfactorily reproducing the modulation components thereof.

In accordance with the invention, a direction-finding system comprises a pair of antenna systems physically spaced by a value which provides a measurable phase difference in at least one direction between wave signals of a given frequency radiated by the antenna systems. The system also includes a pair of carrier-wave translating paths having output circuits individually coupled to the antenna systems and having a common input circuit, and a source of carrier waves coupled to the input circuit and having the aforementioned given frequency. The system additionally includes means for varying the amplitude of the carrier wave translated by one of the paths in accordance with a modulation signal, and means for varying the amplitude of the carrier wave translated by the other of the paths in accordance with such modulation signal but with a predetermined phase displacement relative to the first-named variation to provide around the antenna systems effectively one radiated carrier wave phase-modulated with the modulation signal, the amplitude of the phase modulation varying with the radial direction around the antenna systems from a given reference radial direction.

For a better understanding of the present invention, together with other and further objects thereof, reference is had to the following description taken in connection with the accompanying drawings, and its scope will be pointed out in the appended claims.

Figure 2:
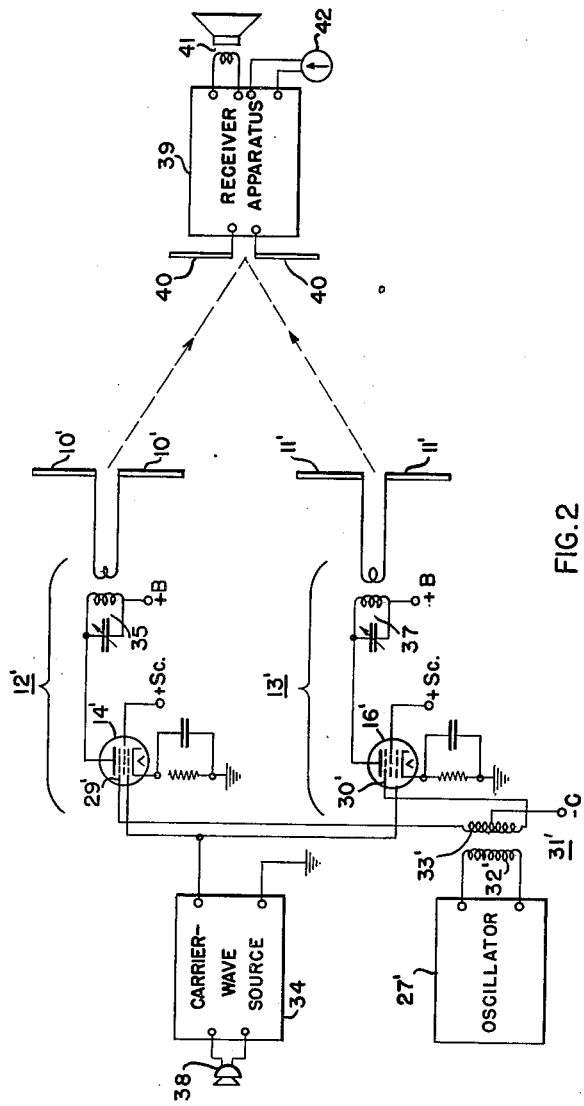
Figure 3:
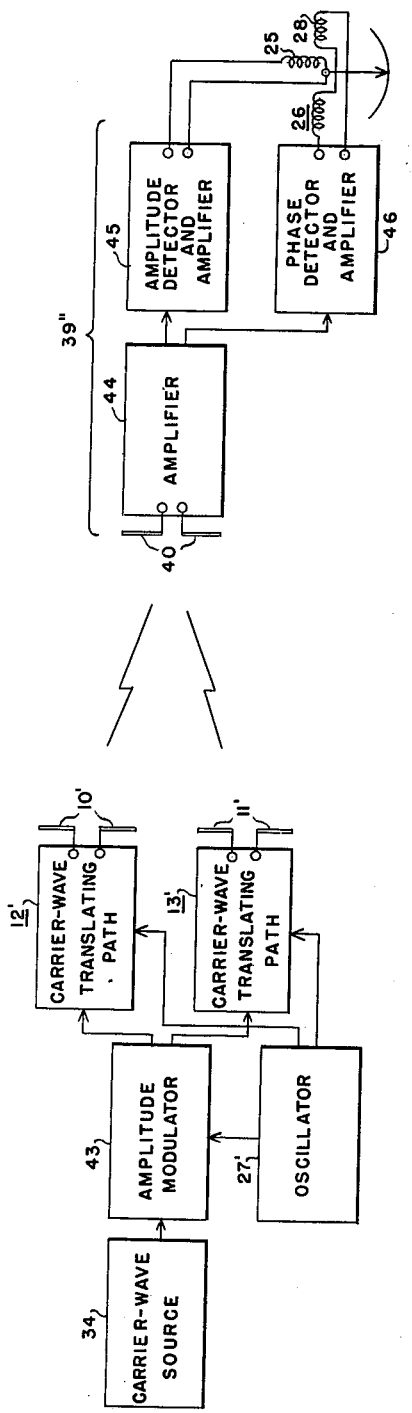

Referring now to the drawings, Fig. 1 is a circuit diagram, partly schematic, of a complete direction-finding system of the carrier-wave receiver type embodying the invention; Fig. 2 is a circuit diagram, also partly schematic, of a complete direction-finding system of the carrier-wave transmitter type embodying a modified form of the invention; and Fig. 3 is a circuit diagram, partly schematic, of a complete direction-finding system embodying an additionally modified form of the invention.

Referring now more particularly to Fig. 1, there is represented schematically a complete direction-finding system of the carrier-wave receiver type embodying the present invention in a preferred form. The system includes a pair of antenna systems 10, 11, which may be of the dipole antenna type, and a pair of carrier-wave translating paths 12, 13, coupled to individual ones of the antenna systems 10, 11 and adapted to translate carrier waves of the same frequency applied thereto from a common carrier-wave source. The carrier-wave source in this form of the invention comprises a single transmitting station, not shown, situated at a distance from the direction-finding system. The translating path 12 comprises a vacuum-tube repeater 14 having an input circuit 15 adapted to be tuned to the frequency of the received carrier wave and coupled to the antenna system 11. Similarly, the translating path 13 comprises a vacuum-tube repeater 16 having an input circuit 17 also adapted to be tuned to the frequency of the received carrier wave and coupled to the antenna system 10. The vacuum-tube repeaters 14 and 16 have a common output circuit which is coupled to the input circuit of an oscillator-modulator 18. Coupled to the output circuit of the oscillator-modulator 18, in the order named, are an intermediate-frequency amplifier 19 of one or more stages, an amplitude detector 20, an audio-frequency amplifier 21 of one or more stages, and a sound-reproducing device 22 comprising a pair of headphones. There is also coupled to the output circuit of the intermediate-frequency amplifier 19, in addition to the amplitude detector 20, an amplitude-limiting system 23 to the output circuit of which is coupled, in the order named, a phase or frequency detector and amplifier 24 and one winding 25 of a zero-center-scale dynamometer type of voltmeter 26. In the event that the detector of unit 24 is of the frequency-detector type, there may be included in the output circuit of the detector, for reasons presently to be considered, a differentiating network.

The direction-finding system includes a source of modulation signals comprising an oscillator 27 which generates oscillations, preferably of sinusoidal wave form and of relatively high audio frequency or supersonic frequency, for example, 15,000 to 20,000 cycles per second. The output circuit of the oscillator 27 is coupled to a second winding 28 of the voltmeter 26, the windings 25 and 28 being normally spring-biased into coaxial alignment in conventional manner when the meter pointer is undeflected, but one of the windings being relatively movable to produce deflections to either side of the zero-center-scale point, in accordance with the relative magnitude and phase of the alternating potentials applied to the windings 25 and 28.

The direction-finding system includes means for varying the amplitude of the carrier wave translated by one of the paths, for example, the path 12, in accordance with the modulation signals, and means for varying the amplitude of the carrier wave translated by the other of the paths, for example, the path 13, in accordance with the modulation signals but with a predetermined phase displacement relative to the variation of the first-named path. This means comprises a control electrode 29 provided in the vacuum-tube repeater 14, a control electrode 30 in the vacuum-tube repeater 16, and a transformer 31 having a primary winding 32 coupled to the output circuit of the oscillator 27 and a secondary winding 33 coupled between the control electrodes 29 and 30. The control electrodes 29 and 30 may comprise conventional suppressor grids and have applied thereto a suitable operating bias through individual halves of the transformer secondary winding 33 from a source of bias potential indicated as —C. The transformer 31 thus applies the oscillations generated by the oscillator 27 to the control electrodes 29 and 30 of the respective vacuum-tube repeaters 14 and 16 with opposite relative phase.

Considering now the operation of the direction-finding system just described, the desired carrier wave from the distant transmitting station is received by each of the antenna systems 10, 11. The phase difference between the carrier waves received by the antenna systems varies with the relative orientation of the antenna systems with respect to the transmitting station due to the different time intervals required for the radiated carrier waves to travel through space to individual ones of the antenna systems for different relative orientation. They have zero phase difference when the transmitting station lies on a line perpendicular to the plane of the dipole antennas 10 and 11 and maximum phase difference when the transmitter lies in the plane thereof, the carrier signal received by the antenna system closer to the transmitting station having leading phase relative to the carrier signal received by the other antenna system. The received carrier waves are applied to individual ones of the vacuum-tube repeaters 14 and 16 and are repeated thereby to their common output circuit. However, the oscillations applied to the control electrodes 29 and 30 of the respective vacuum-tube repeaters 14 and 16 from the oscillator 27 vary the repeating ratios of the vacuum-tube repeaters in opposite senses in accordance therewith. There is consequently derived in the common output circuit of the vacuum-tube repeaters 14 and 16 a phase-modulated carrier wave, which may correspondingly be considered a frequency-modulated carrier wave, the degree and sense of the phase or frequency modulation of which varies with the phase difference between the carrier waves received by the antenna systems 10 and 11. By the term "sense" of the phase or frequency modulation, as here used, is meant that, for a selected half-cycle of the oscillations of oscillator 27, the carrier signal derived in the common output circuit of the vacuum-tube repeaters 14 and 16 has a phase or frequency advanced or retarded with respect to that phase or frequency which it has when the carrier signals received by the antenna systems 10 and 11 have zero phase difference, its phase or frequency being advanced or retarded, for example, when the phase of the carrier signal received by the antenna system 10 respectively leads or lags that of the carrier signal received by the antenna system 11. This derived phase-modulated carrier wave is converted to an intermediate-frequency phase-modulated carrier wave by the oscillator-modulator 18, is amplified by the intermediate-frequency amplifier 19, is limited to a predetermined substantially constant amplitude by the limiting system 23, and the phase-modulation or corresponding frequency-modulation components thereof are derived by the phase or frequency detector of unit 24. When the detector of unit 24 is of the phase-detector type, the derived phase-modulation components correspond to the modulation signal, the latter comprising the oscillations which are generated by the oscillator 27. When the detector of unit 24 is of the frequency-detector type, the detector derives the modulation components, but the wave form of the latter is that obtained by differentiation of the modulation signal. In this case, the derived modulation components are applied to the amplifier of unit 24 through an integrating network included in the output circuit of the detector, the integrating network serving to restore to the derived modulation components the wave form which they should have accurately to correspond to the modulation signal. It is to be understood that any reference to a frequency detector in this specification is intended to be one which includes the integrating network in its output circuit.

It may be noted at this point that when the oscillations generated by unit 27 have a sinusoidal wave form, the integrating network becomes merely one to provide a 90-degree phase shift and in this event may be included in the output circuit of the frequency detector of unit 24 or in circuit with either of the windings 25 or 28 of the voltmeter 26. Such a phase-shifting network is, in general, a differentiating or an integrating network; when it handles a single frequency, the difference between these two is determinable only by the relative polarity of the phase-shifting network's output. The modulation components derived by the detector of unit 24 are amplified by the amplifier of this unit and applied to the winding 25 of the voltmeter 26. There is consequently applied to the windings 25 and 28 of the voltmeter modulation signals of the same frequency and wave form but differing in relative amplitude and phase in accordance with the phase difference between the carrier waves received by the antenna systems 10, 11. The resultant deflections of the voltmeter 26 directly indicate the relative orientation of the antenna systems 10 and 11 with respect to the transmitting station from which the received carrier wave is radiated.

The voltmeter 26, as previously stated, is preferably of the zero-center-scale type. The direction indication provided by the deflections of voltmeter 26 may be utilized in either of two ways. The first of these requires that the antenna systems 10 and 11 be rotatable about an axis parallel to the dipole antennas 10 and 11. In this method of operation, the antenna systems 10 and 11 are rotated or oriented about their axis until the transmitting station lies on a line perpendicular to the plane of the dipole antennas 10 and 11, at which time the carrier waves received by the antenna systems have zero-phase difference and the degree of phase modulation of the phase-modulated carrier wave, derived in the common output circuit of the vacuum-tube repeaters 14 and 16, is zero with resultant absence of deflection of the voltmeter 26 from its zero-center-scale point. This method of operation is perhaps the preferred one since the direction of deflection of the voltmeter 26 from its zero-center-scale point directly indicates the direction in which the antenna systems 10 and 11 should be rotated to obtain the desired bearing on the transmitting station. It may be noted in this regard that the indications of voltmeter 26 provide an indication not only of the direction of the transmitting station from the antenna systems 10 and 11, but also of the sense of that direction. Thus, if rotation of the antenna systems 10 and 11 in the direction indicated by a particular deflection of the voltmeter 26 produces a larger deflection of the voltmeter, continued rotation of the antenna systems in the same direction will produce further increasing deflections up to a maximum value but thereafter the deflections will decrease until zero deflection is attained, at which time it will be known that the transmitting station lies not only on a line perpendicular to the plane of the dipole antennas 10 and 11 but also is positioned on a particular side thereof.

A second method of operating the direction-finding system of the invention is one which requires that the antenna systems 10 and 11 be fixed in space, rather than being rotatable. In this case, the deflections of voltmeter 26 may be directly calibrated in degrees of orientation of the antenna systems 10 and 11 with respect to the positions which any transmitting station may have about the antenna systems. This method of operation provides an indication of the direction of a transmitting station from the antenna systems 10 and 11, but does not provide an indication of the sense of direction.

In the event that the received carrier wave is also amplitude-modulated or frequency-modulated in accordance with a modulation signal, the direction-finding system of the invention has the advantage that the modulation-signal components of the carrier wave may be continuously and satisfactorily reproduced simultaneously with the taking of a bearing on the transmitting station. This results from the fact that the act of taking a bearing on the transmitting station does not require that the antenna system be so oriented that the carrier wave received thereby has minimum intensity. The continuous reproduction of the amplitude-modulation or frequency-modulation components of the received carrier wave simultaneously with the act of taking a bearing on the source thereof is of great importance where two direction-finding systems are simultaneously taking bearings on the source to determine the position thereof by the method of triangulation, and it is essential that the operators of both direction-finding systems be certain that they are taking bearings on the same transmitting station. This is particularly important where the transmitting station is of the mobile type and is in continuous motion or is moved at frequent intervals.

It has been stated that the carrier wave derived in the common output circuit of the vacuum tube repeaters 14 and 16 is phase-modulated with the modulation signal derived from the oscillator 27. If the received carrier wave is itself amplitude-modulated or frequency-modulated by a modulating signal to be transmitted, the received carrier wave and its modulation components are translated by the vacuum-tube repeaters 14 and 16 and the derived carrier wave consequently is both amplitude-modulated or frequency-modulated with the signal to be transmitted and also phase-modulated with the signal derived from the oscillator 27.

If the received carrier wave is amplitude-modulated, for example, the amplitude-modulation components of the derived carrier wave are removed by the limiting system 23 and thus do not affect the indications of the voltmeter 26, but are derived by the detector 20, which in this case is of the amplitude-detector type, are amplified by the audio-frequency amplifier 21, and are reproduced by the sound reproducer 22 in conventional manner. When the detector 20 is of the amplitude type, it normally is not responsive to the phase-modulation components of the derived carrier wave. If it does tend to derive some portion of the phase-modulation component, however, the latter may be removed by a band-rejection filter included in the audio-frequency amplifier 21 and sharply-tuned to the frequency of the oscillations generated by the oscillator 27.

If, on the other hand, the received carrier wave is frequency-modulated with a signal to be transmitted, the detector 20 is of the frequency-detector type. In this event, the band-rejection filter just referred to must be included in the audio-frequency amplifier 21 to avoid reproduction of the oscillations of unit 27. Also, unit 24 must include a band-pass filter in the output of either the detector or amplifier thereof, the filter being tuned to the frequency of the oscillations of unit 27 to suppress in the output circuit of this unit all modulation components of the derived carrier wave except the phase-modulation or frequency-modulation components due to the oscillations of unit 27.

From the above description of the invention, it will be evident that the common output circuit of the vacuum-tube repeaters 14 and 16 comprises means for combining the carrier waves translated by the antenna systems 10, 11, and their associated tranlating paths, 12, 13, respectively, to derive a carrier wave phase-modulated with the modulation signal applied thereto from the oscillator 27, the degree of the phase modulation varying with the relative orientation of the antenna systems 10, 11 with respect to a predetermined point in space which, in this case, is the location of the carrier-wave transmitting station. The phase or frequency detector of unit 24 and the voltmeter 26 comprise means for deriving and utilizing the phase-modulation components of the carrier wave derived in the common output circuit of the vacuum-tube repeaters 14 and 16 to provide a direction indication. It will further be evident that the amplitudes of the carrier waves translated by the translating paths 12 and 13 are varied cyclically and continuously by the oscillations applied to the vacuum-tube repeaters 14 and 16, respectively, from the oscillator 27, the variation of amplitude of the carrier wave translated by the translating path 13 due to the oscillator 27 being at the same frequency as but with a predetermined phase displacement, in the arrangement described 180 degrees, relative to the corresponding amplitude variations of the carrier wave translated by the translating path 12.

If desired, a phase-shifting network, not shown, may be included in circuit with either the winding 25 or the winding 28 of the voltmeter 26 to permit correction of minor phase errors accumulated around the system which would tend to produce slight errors in the direction indications provided by the Fig. 1 arrangement.

Fig. 2 represents schematically a complete direction-finding system of the transmitter type embodying the invention in a modified form. Circuit elements in the present arrangement corresponding to similar elements of the Fig. 1 arrangement are designated by similar reference numerals primed. In this arrangement, there is provided a carrier-wave source 34 having an output circuit which is coupled to an input circuit common to a pair of carrier-wave translating paths 12′ and 13′. The translating path 12′ includes a vacuum-tube repeater 14′ having an output circuit comprising a circuit 35 tuned to the frequency of the carrier waves of the source 34 and coupled to an antenna system 10′. The carrier-wave translating path 13′ similarly includes a vacuum tube repeater 16′ having an output circuit comprising a circuit 37 also tuned to the frequency of the carrier waves of the source 34 and coupled to an antenna system 11′. An oscillator 27′ has an output circuit coupled to the primary winding 32′ of a transformer 31′, the transformer having a secondary winding 33′ which is coupled between a control electrode 29′ included in the vacuum tube 14′ and a control electrode 30′ included in the vacuum tube 16′. The carrier waves of the source 34 may be amplitude-modulated, in accordance with speech signals to be transmitted, by a microphone 38 coupled to a modulating circuit thereof.

The carrier waves radiated by the antenna systems 10′ and 11′ may be received at a remote point by a receiver apparatus 39 which has an input circuit coupled to an antenna system 40 and may include a radio-frequency amplifier of one or more stages, to the output circuit of which is coupled both a phase or frequency detector and an amplitude detector. The amplitude detector is coupled through an audio-frequency amplifier of one or more stages to a sound reproducer 41. The phase or frequency detector of the receiver 39 also is coupled through an audio-frequency amplifier of one or more stages to an indicating device 42 which may be a conventional form of alternating-current voltmeter.

Considering now the operation of this modified form of direction-finding system, the carrier wave of source 34 is applied to the common input circuit of the vacuum-tube repeaters 14′ and 16′ and is translated thereby through their respective output circuits 35, 37, to the respective antenna systems 10′ and 11′ for radiation. The amplitude of the carrier waves translated by the translating paths 12′ and 13′ is, however, varied in opposite senses by the oscillations applied from the oscillator 27′ to the control electrodes 29′ and 30′ of the respective vacuum-tube repeaters 14′ and 16′. Thus, the carrier waves radiated by the antenna systems 10′ and 11′ may be received and combined, as in the input circuit of the receiving apparatus 39, to derive a carrier wave which, assuming that the carrier wave of source 34 is not amplitude-modulated, is of substantially constant amplitude but phase-modulated with the oscillations of the oscillator 27'. The degree and sense of the phase modulation of the derived carrier wave varies with the relative orientation of the antenna systems 10' and 11' with respect to the point in space of reception of the carrier waves by the receiving apparatus 39. The phase-modulated carrier wave thus derived is amplified by the radio-frequency amplifiers of the receiving apparatus 39 and the phase-modulation components thereof are derived by the phase or frequency detector of unit 39. The modulation components are amplified by the amplifier of the receiving apparatus 39 and are applied to the voltmeter 42 which produces a deflection varying with the degree of the phase modulation of the derived phase-modulated carrier wave, thus to provide an indication of the direction of the point of reception from the antenna systems 10' and 11' of the transmitter apparatus. The direction indication provided by the receiving apparatus 39 and voltmeter 42 does not furnish an indication of the sense of direction of the point of reception from the transmitter apparatus.

This may be accomplished, however, by a slightly modified form of the invention wherein the carrier wave of source 34 is amplitude modulated by the oscillations of unit 27'. A system of this type is shown in Fig. 3, which is essentially similar to the system of Fig. 2 and similar elements are designated by similar reference numerals and analogous elements by similar reference numerals double primed. The transmitter of the Fig. 3 system includes an amplitude modulator 43 having an input circuit coupled to the carrier-wave source 34 and having the same or an additional input circuit so coupled to the output circuit of the oscillator 27' that the carrier wave of source 34 is amplitude-modulated by the oscillations of the latter unit. As in the Fig. 2 system, the oscillations of the oscillator 27' are applied with opposite polarities to the vacuum tubes included in the wave-signal translating paths 12' and 13' by which to control in opposite senses the amplitudes of the modulated wave signals translated by the translating paths. There is thus provided around the antenna system 10', 11' of the transmitter effectively one radiated carrier wave, both phase-modulated and amplitude modulated with the oscillations of oscillator 27'. No characteristic of the amplitude modulation is affected by the choice of the point of reception of the radiated carrier wave. The phase modulation, on the other hand, varies in amplitude with the radial direction around the antenna system from a given reference radial direction.

The receiver 39" of the Fig. 3 system may include a wave-signal amplifier 44 having an output circuit coupled to the input circuit of an amplitude detector and amplifier 45 and also to an input circuit of a phase detector and amplifier 46. The amplitude-modulation components of the received wave signal, these modulation components corresponding to the oscillations of the oscillator 27' of the transmitter, are derived by the detector of unit 45, are suitably amplified by the amplifier of the latter unit, and are applied to the winding 25 of a zero-center-scale dynamometer-type of voltmeter 26. The phase-modulation components of the received wave signal also correspond to the oscillations of the oscillator 27' of the transmitter, but the amplitudes of the phase-modulation components vary, as previously mentioned, with the relative orientation of the transmitter antenna systems 10', 11' with respect to the point of reception of the carrier wave, as in the Fig. 2 system. These phase-modulation components are derived by the phase detector of unit 46, are amplified by the amplifier of the latter unit and are applied to the second winding 28 of voltmeter 26. There are consequently applied to the windings 25 and 28 of the voltmeter 26 modulation signals of the same frequency and wave form but differing in relative amplitude and phase in accordance with the effective phase modulation of the wave-signal energy received by the receiver. The resultant deflections of voltmeter 26 thus directly indicate the direction and sense of direction of the transmitter antenna systems 10', 11' with respect to the point of reception of the carrier-wave energy.

The radiated carrier waves may also be amplitude-modulated in accordance with a desired signal to be transmitted. Thus, the microphone 38 of Fig. 2 derives a modulation signal to be transmitted and this signal is utilized to amplitude-modulate the carrier waves of source 34. After amplification of the received carrier waves in the radio-frequency amplifier of unit 39, the amplitude-modulation components are derived by the amplitude-detector of the receiver 39 and are amplified by the audio-frequency amplifier thereof and applied to the sound reproducer 41 for reproduction. In this connection, it may be noted that the amplitude-modulation components of the received carrier waves are continuously and satisfactorily reproduced while, at the same time, the meter 42 indicates the relative position of the receiving apparatus from the antenna systems 10' and 11' of the transmitter.

The direction-finding system of the modified forms shown in Figs. 2 and 3 has an important application in producing a radio-beacon beam by which aircraft in flight, carrying the receiving apparatus 39 or 39", may be navigated along a desired course.

While it has been stated that the oscillations generated by the oscillator 27 of Fig. 1 or the oscillator 27' of Fig. 2 or Fig. 3 preferably have sinusoidal wave form, it will be evident that the oscillations may have other wave forms, for example, saw-tooth wave form, it being only necessary that the repeating ratios of the vacuum-tube repeaters 14 and 16 of the Fig. 1 arrangement, or, correspondingly, the vacuum-tube repeaters 14' and 16' of the Fig. 2 arrangement, be cyclically and continuously varied by the oscillations applied to these repeaters.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A direction-finding system comprising, a pair of antenna systems physically spaced by a value which provides a measurable phase difference in at least one direction between wave signals of a given frequency radiated by said antenna systems, a pair of carrier-wave translating paths having output circuits individually coupled to said antenna systems and having a common input circuit, a source of carrier waves coupled to said input circuit and having said given frequency, means for varying the amplitude of the carrier wave translated by one of said paths in accordance with a modulation signal, and means for varying the amplitude of the carrier wave translated by the other of said paths in accordance with said modulation signal but with a predetermined phase displacement relative to said first-named variation to provide around said antenna systems effectively one radiated carrier wave phase-modulated with said modulation signal, the amplitude of said phase modulation varying with the radial direction around said antenna systems from a given reference radial direction.

2. A direction-finding system comprising, a pair of antenna systems physically spaced by a value which provides a measurable phase difference in at least one direction between wave signals of a given frequency radiated by said antenna systems, a pair of carrier-wave translating paths having output circuits individually coupled to said antenna systems and having a common input circuit, a source of carrier waves coupled to said input circuit and having said given frequency, and means for cyclically and continuously varying the amplitude of the carrier wave translated by one of said paths and for cyclically and continuously varying the amplitude of the carrier wave translated by the other of said paths at the same frequency as but with a predetermined phase displacement relative to said first-named cyclical variation to provide around said antenna systems effectively one radiated carrier wave phase-modulated with said cyclical variation, the amplitude of said phase modulation varying with the radial direction around said antenna systems from a given reference radial direction.

3. A direction-finding system comprising, a pair of antenna systems physically spaced by a value which provides a measurable phase difference in at least one direction between wave signals of a given frequency radiated by said antenna systems, a pair of vacuum-tube repeaters having output circuits individually coupled to said antenna systems and having a common input circuit, a source of carrier waves coupled to said input circuit and having said given frequency, means for varying the repeating ratio of one of said vacuum-tube repeaters in accordance with a modulation signal, and means for varying the repeating ratio of the other of said vacuum-tube repeaters in accordance with said modulation signal but with a predetermined phase displacement relative to said first-named variation to provide around said antenna systems effectively one radiated carrier wave phase-modulated with said modulation signal, the amplitude of said phase modulation varying with the radial direction around said antenna systems from a given reference radial direction.

4. A direction-finding system comprising, a pair of antenna systems physically spaced by a value which provides a measurable phase difference in at least one direction between wave signals of a given frequency radiated by said antenna systems, a pair of vacuum-tube repeaters having output circuits individually coupled to said antenna systems and having a common input circuit, a source of carrier waves coupled to said input circuit and having said given frequency, a source of oscillations, means responsive to the oscillations of said source for varying the repeating ratio of one of said vacuum-tube repeaters, and means responsive to the oscillations of said source for varying the repeating ratio of the other of said vacuum-tube repeaters but with a predetermined phase displacement relative to said first-named variation to provide around said antenna systems effectively one radiated carrier wave phase-modulated with the oscillations of said source, the amplitude of said phase modulation varying with the radial direction around said antenna systems from a given reference radial direction.

5. A direction-finding system comprising, a pair of antenna systems physically spaced by a value which provides a measurable phase difference in at least one direction between wave signals of a given frequency radiated by said antenna systems, a pair of vacuum-tube repeaters having output circuits individually coupled to said antenna systems and having a common input circuit, a source of carrier waves coupled to said input circuit and having said given frequency, a source of oscillations of sinusoidal wave form, means responsive to the oscillations of said source for varying the repeating ratio of one of said vacuum-tube repeaters in accordance with said oscillations, and means responsive to the oscillations of said source for varying the repeating ratio of the other of said vacuum-tube repeaters in accordance with said oscillations but with a predetermined phase displacement relative to said first-named variation to provide around said antenna systems effectively one radiated carrier wave phase-modulated with the oscillations of said source, the amplitude of said phase modulation varying with the radial direction around said antenna systems from a given reference radial direction.

6. A direction-finding system comprising, a pair of antenna systems physically spaced by a value which provides a measurable phase difference in at least one direction between wave signals of a given frequency radiated by said antenna systems, a pair of carrier-wave translating paths having output circuits individually coupled to said antenna systems and having a common input circuit, a source of carrier waves coupled to said input circuit and having said given frequency, a source of oscillations, and means responsive to the oscillations of said source for varying in opposite senses the amplitudes of the carrier waves translated by said paths in accordance with said oscillations to provide around said antenna systems effectively one radiated carrier wave phase-modulated with the oscillations of said source, the amplitude of said phase modulation varying with the radial direction around said antenna systems from a given reference radial direction.

7. A direction-finding system comprising, a pair of antenna systems physically spaced by a value which provides a measurable phase difference in at least one direction between wave signals of a given frequency radiated by said antenna systems, a pair of carrier-wave translating paths having output circuits coupled to individual ones of said antenna systems and having a common input circuit, a source of carrier waves coupled to said input circuit, means for varying the amplitude of the carrier wave translated by one of said paths in accordance with a modulation signal, means for varying the amplitude of the carrier wave translated by the other of said paths in accordance with said modulation signal but with a predetermined phase displacement relative to said first-named variation to provide around said antenna systems effectively one radiated carrier wave phase-modulated with said modulation signal, the amplitude of said phase modulation varying with the radial direction around said antenna systems from a given reference radial direction, means for receiving said radiated phase-modulated carrier wave and responsive to the phase-modulation components thereof for deriving a control effect, and means responsive to said control effect for indicating the direction of the point of reception of said carrier wave with respect to said antenna systems.

8. A direction-finding system comprising, a pair of antenna systems physically spaced by a value which provides a measurable phase difference in at least one direction between wave signals of a given frequency radiated by said antenna systems, a pair of carrier-wave translating paths having output circuits coupled to individual ones of said antenna systems and having a common input circuit, a source of carrier waves, a source of modulation signals, means responsive to said modulation signals for modulating said carrier waves with a first type of modulation and for applying said modulated carrier waves to said input circuit, means for varying the amplitude of the modulated carrier waves translated by one of said paths in accordance with said modulation signal, means for varying the amplitude of the modulated carrier waves translated by the other of said paths in accordance with said modulation signal but with a predetermined phase displacement relative to said first-named variation to provide around said antenna systems effectively one radiated carrier wave phase-modulated by said modulation signals and additionally modulated by said modulation signals in accordance with said first type of modulation, the amplitude of said phase modulation varying with the radial direction around said antenna systems from a given reference radial direction, means for receiving said radiated carrier wave, a phase detector for deriving from said received carrier wave a first signal corresponding to the phase-modulation components thereof, a second detector for deriving from said received carrier wave a second signal corresponding to the modulation components of said first type of modulation, and means responsive jointly to said signals for indicating the direction and sense of direction of the point of reception of said carrier wave with respect to said antenna systems.

ARTHUR V. LOUGHREN.